US012451959B2

(12) United States Patent
Yang et al.

(10) Patent No.: US 12,451,959 B2
(45) Date of Patent: Oct. 21, 2025

(54) COMMUNICATION APPARATUS AND METHOD FOR HANDLING INTERFERENCE ON A NON-TERRESTRIAL NETWORK

(71) Applicant: MediaTek Singapore Pte. Ltd., Singapore (SG)

(72) Inventors: Chen Yang, Shanghai (CN); Yixi Wang, Shanghai (CN); Qiming Li, Shanghai (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 440 days.

(21) Appl. No.: 17/970,587

(22) Filed: Oct. 21, 2022

(65) Prior Publication Data

US 2024/0072885 A1 Feb. 29, 2024

(30) Foreign Application Priority Data

Aug. 31, 2022 (CN) .......................... 202211060087.2

(51) Int. Cl.
| | | |
|---|---|---|
| H04W 72/0453 | (2023.01) | |
| H04B 7/185 | (2006.01) | |
| H04W 16/14 | (2009.01) | |
| H04W 24/02 | (2009.01) | |
| H04W 24/08 | (2009.01) | |
| H04W 24/10 | (2009.01) | |

(52) U.S. Cl.
CPC ................................ H04B 7/18513 (2013.01)

(58) Field of Classification Search
CPC .......... H04B 7/18513; H04W 72/0453; H04W 16/14; H04W 24/10; H04W 72/1215; H04W 24/02; H04W 24/08; H04W 48/16; H04W 48/18
See application file for complete search history.

(56) References Cited

U.S. PATENT DOCUMENTS

| | | | |
|---|---|---|---|
| 2019/0037418 A1* | 1/2019 | Gunasekara | .......... H04W 52/40 |
| 2020/0389937 A1* | 12/2020 | Liu | ........................ H04W 48/18 |

(Continued)

FOREIGN PATENT DOCUMENTS

| | | |
|---|---|---|
| CN | 102714799 A | 10/2012 |
| CN | 113395778 A | 9/2021 |

(Continued)

*Primary Examiner* — Kevin T Bates
*Assistant Examiner* — Yonghong Zhao
(74) *Attorney, Agent, or Firm* — Winston Hsu (57) ABSTRACT

An embodiment of the invention provides a communication apparatus comprising a radio transceiver and a processing circuit. The radio transceiver is configured to transmit or receive wireless signals. The processing circuit is coupled to the radio transceiver and configured to perform operations comprising: performing at least one first service with at least one network; determining to perform at least one second service with a non-terrestrial network (NTN); detecting interference on the NTN caused by at least one first frequency band of the at least one network; configuring the at least one first frequency band according to a desense table in response to the interference; performing the at least one second service with the NTN, after configuring the at least one first frequency band; and reconfiguring the at least one first frequency band, after performing the at least one second service with the NTN.

14 Claims, 7 Drawing Sheets

(56) References Cited

U.S. PATENT DOCUMENTS

| | | | | |
|---|---|---|---|---|
| 2023/0043459 A1* | 2/2023 | Shrestha | ............... | H04W 76/30 |
| 2023/0088930 A1* | 3/2023 | Mody | ................... | H04W 16/14 370/329 |
| 2023/0362692 A1* | 11/2023 | Shrestha | ............... | H04W 48/12 |
| 2023/0403585 A1* | 12/2023 | Ryu | ................... | H04B 7/18545 |

FOREIGN PATENT DOCUMENTS

| | | |
|---|---|---|
| CN | 113938179 A | 1/2022 |
| CN | 113950065 A | 1/2022 |
| CN | 114651515 A | 6/2022 |
| CN | 114916051 A | 8/2022 |
| TW | 202121920 A | 6/2021 |

\* cited by examiner

COMMUNICATION APPARATUS AND METHOD FOR HANDLING INTERFERENCE ON A NON-TERRESTRIAL NETWORK

BACKGROUND

New advances in a fifth generation (5G) standard create opportunities to integrate a non-terrestrial network (NTN) into an interoperable and standardized wireless experience across the globe. The NTN is able to satisfy requests of anywhere and anytime connection by offering wide-area coverage and ensuring service availability, continuity and scalability. However, there exists interference on the NTN caused by other network(s), including terrestrial networks (TNs), a wireless local area network (WLAN), a personal area network (PAN), etc., makes the NTN to work inefficiently on an user equipment (UE) supporting the NTN and the other network(s) simultaneously. Therefore, how to avoid the interference on the NTN to realize coexistence of the NTN and the other network(s) is an important problem to be solved.

SUMMARY

It is an objective of the invention to provide a communication apparatus, in order to solve the above problem.

An embodiment of the invention provides a communication apparatus comprising a radio transceiver and a processing circuit. The radio transceiver is configured to transmit or receive wireless signals. The processing circuit is coupled to the radio transceiver and configured to perform operations comprising: performing at least one first service with at least one network; determining to perform at least one second service with a non-terrestrial network (NTN); detecting interference on the NTN caused by at least one first frequency band of the at least one network; configuring the at least one first frequency band of the at least one network according to a desense table in response to the interference; performing the at least one second service with the NTN, after configuring the at least one first frequency band of the at least one network; and reconfiguring the at least one first frequency band of the at least one network, after performing the at least one second service with the NTN.

An embodiment of the invention provides a method for handling interference on a non-terrestrial network (NTN) comprising: performing at least one first service with at least one network; determining to perform at least one second service with the NTN; detecting the interference on the NTN caused by at least one first frequency band of the at least one network; configuring the at least one first frequency band of the at least one network according to a desense table in response to the interference; performing the at least one second service with the NTN, after configuring the at least one first frequency band of the at least one network; and reconfiguring the at least one first frequency band of the at least one network, after performing the at least one second service with the NTN.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
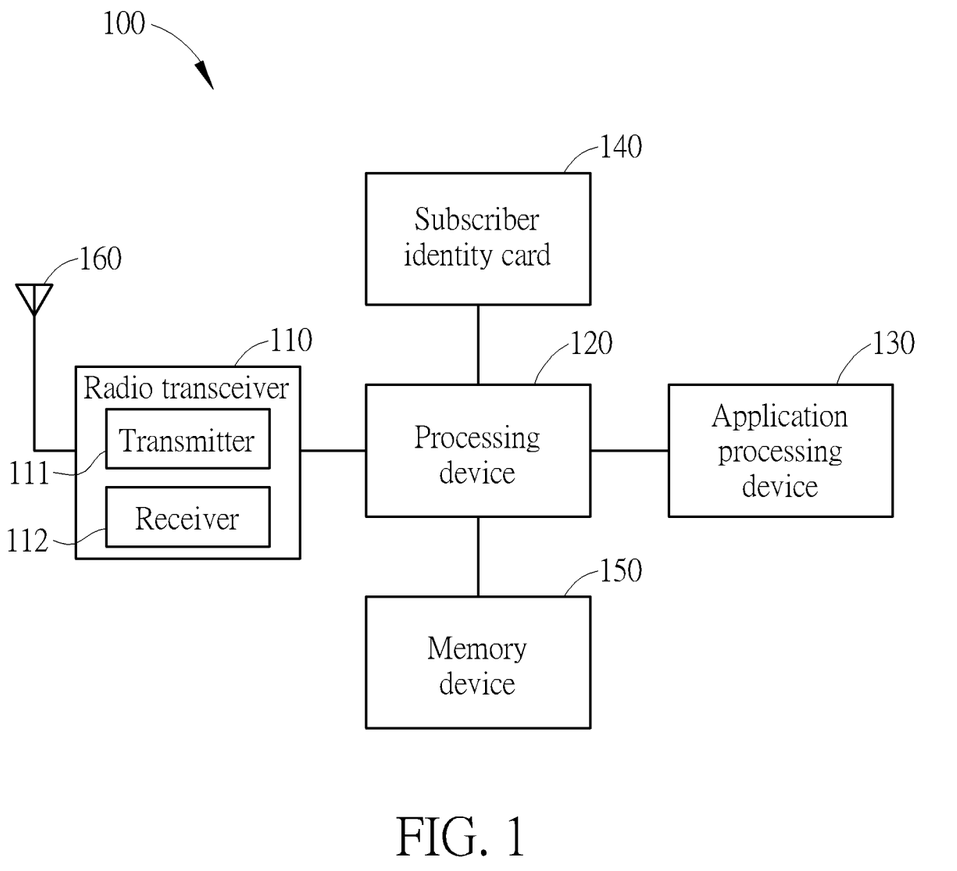
FIG. 1 is an exemplary block diagram of a communication apparatus according to an embodiment of the invention.

FIG. 1 is an exemplary block diagram of a communication apparatus 100 according to an embodiment of the invention. The communication apparatus 100 may be a portable electronic device, such as a Mobile Station (MS), which may be interchangeably referred to as User Equipment (UE). The communication apparatus 100 may comprise a radio transceiver 110, a processing device 120, an application processing device 130, a subscriber identity card 140, a memory device 150 and at least one antenna 160. The radio transceiver 110 may be configured to transmit and/or receive wireless signals to and/or from a network device (not shown) via the antenna(s) 160, so as to communicate with the network device via a communication link established between the communication apparatus 100 and the network device. The radio transceiver 110 may comprise a receiver 112 configured to receive wireless signals and a transmitter 111 configured to transmit wireless signals. The radio transceiver 110 may be further configured to perform radio frequency (RF) signal processing. For example, the receiver 112 may convert the received signals into intermediate frequency (IF) or baseband signals to be processed, or the transmitter 111 may receive the IF or baseband signals from the processing device 120 and convert the received signals into wireless signals to be transmitted to the network device in the wireless network or in an access network (e.g., a terrestrial network (TN), a non-terrestrial network (NTN), a wireless local area network (WLAN), a personal area network (PAN) or a wireless local access network). According to an embodiment of the invention, the network device may be a cell, a Node-B (NB), an evolved Node-B (eNB), a g Node-B (gNB), a base station, a Mobility Management Entity (MME), an Access and Mobility Management Function (AMF) device, etc., at the network side and communicating with the communication apparatus 100 by the wireless signals via the communication link.

The transmitter 111 and the receiver 112 of the radio transceiver 110 may comprise a plurality of hardware devices to perform RF conversion and RF signal processing. For example, the transmitter 111 and/or the receiver 112 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a long-term evolution (LTE) system, the frequency of any specific frequency band for a 5G next generation (NR) system, the frequency of any specific frequency band for a WiFi system, or the frequency of any specific frequency band for a Bluetooth (BT) system, etc.

The processing device 120 may be configured to handle corresponding communication protocol operations and processing the signals received from or to be transmitted to the radio transceiver 110. The application processing device 130 is configured to run the operating system of the communication apparatus 100 and to run application programs installed in the communication apparatus 100. The processing device 120 and the application processing device 130 can be realized by means of hardware (circuitry), software, firmware (known as a combination of a hardware device and computer instructions and data that reside as read-only software on the hardware device), an electronic system, or combination thereof. In the embodiments of the invention, the processing device 120 and the application processing device 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a subscriber identity module (SIM), universal mobile telecommunication system (UMTS) SIM (USIM), removable user identity module (R-UIM) or code division multiple access (CDMA) SIM (CSIM) card, or the like and may typically contain user account information, an International Mobile Subscriber Identity (IMSI) and a set of SIM application toolkit (SAT) commands and may provide storage space for phone book contacts. The memory device 150 may be coupled to the processing device 120 and the application processing device 130 and may store system data or user data.

It should be noted that, in order to clarify the concept of the invention, FIG. 1 presents a simplified block diagram in which only the elements relevant to the invention are shown. For example, in some embodiments of the invention, the communication apparatus 100 may further comprise some peripheral devices not shown in FIG. 1. In another example, in some embodiments of the invention, the communication apparatus 100 may further comprise a central controller coupled to the processing device 120 and the application processing device 130. Therefore, the invention should not be limited to what is shown in FIG. 1.

In some embodiments of the invention, the communication apparatus 100 is capable of supporting multiple radio access technologies (RATs) communications via the single-card structure as shown in FIG. 1. It should be noted that, although FIG. 1 shows a single-card application, the invention should not be limited herein. For example, in some embodiments of the invention, the communication apparatus 100 may comprise multiple subscriber identity cards to support the multi-RATs communications, in either a single-standby or a multiple-standby manner. In the multi-RATs communication applications, the modem, the radio transceiver and/or the antenna module may be shared by the subscriber identity card(s) and may have the capability of handling the operations of different RATs and processing the corresponding RF, IF or baseband signals in compliance with the corresponding communication protocols.

In addition, those who are skilled in this technology can still make various alterations and modifications based on the descriptions given above to derive the communication apparatuses comprising multiple radio transceivers and/or multiple antenna modules for supporting multi-RAT wireless communications without departing from the scope and spirit of this invention. Therefore, in some embodiments of the invention, the communication apparatus 100 may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be virtual cards, such as individual identifiers, numbers, addresses, or the like which are burned in the internal memory device of the corresponding modem and are capable of identifying the communication apparatus 100. Therefore, the invention should not be limited to what is shown in FIG. 1.

It should be further noted that in some embodiments of the invention, the communication apparatus 100 may further support multiple IMSIs.

Figure 2:
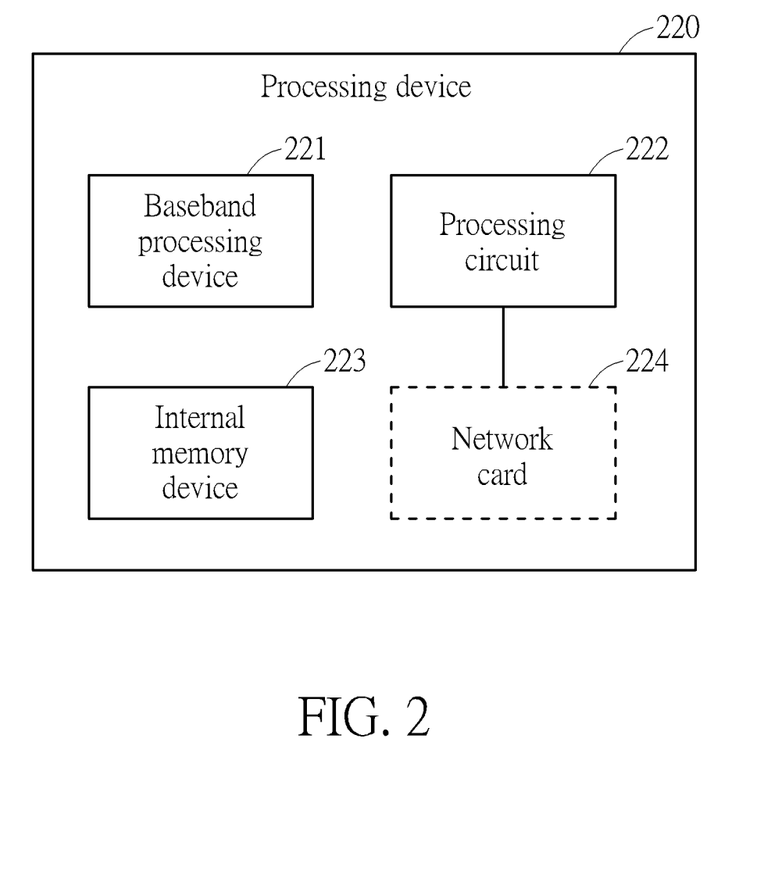
FIG. 2 is an exemplary block diagram of a modem according to an embodiment of the invention.

FIG. 2 is an exemplary block diagram of a processing device 220 according to an embodiment of the invention. The processing device 220 may be the processing device 120 shown in FIG. 1 and may comprise at least a baseband processing device 221, a processing circuit 222, an internal memory device 223 and a network card 224. The baseband processing device 221, the processing circuit 222, the internal memory device 223 and the network card 224 can be realized by means of hardware (circuitry), software, firmware, an electronic system, or combination thereof. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware circuits to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The processing circuit 222 may control the operations of the processing device 220. According to an embodiment of the invention, the processing circuit 222 may be a processor arranged to execute the program codes of the processing device 220. For example, the processing circuit 222 may maintain and execute the individual tasks, threads, and/or protocol stacks for different software modules. A protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

In some embodiments of the invention, the processing circuit 222 may be pure hardware dedicated to dealing with the proposed method for handling interference on a non-terrestrial network. This alternative design also falls within the scope of the present invention.

The processing circuit 222 may also read data from the subscriber identity card coupled to the processing device (e.g., the subscriber identity card 140 in FIG. 1), and write data to the subscriber identity card. The internal memory device 223 may store system data and user data for the processing device 220. The processing circuit 222 may also access the internal memory device 223.

The network card 224 provides Internet access services for the communication apparatus 100. It should be noted that, although the network card 224 shown in FIG. 2 is configured inside of the processing device 220, the invention should not be limited thereto. In some embodiments of the invention, the communication apparatus 100 may also comprise a network card configured outside of the processing device, or the communication apparatus 100 may also be coupled to an external network card for providing Internet access services. In some embodiments of the invention, the network card 224 may be a virtual network card, instead of a tangible card, that is created by the operating system of the communication apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the processing device 220 may also comprise more than one processing circuit and/or more than one baseband processing device. For example, the processing device 220 may comprise multiple processing circuits and/or multiple baseband processing devices for supporting multi-RAT operations. Therefore, the invention should not be limited to what is shown in FIG. 2.

It should be further noted that in some embodiments of the invention, the baseband processing device 221 and the processing circuit 222 may be integrated into one processing unit, and the processing device may comprise one or multiple such processing units, for supporting multi-RAT operations. Therefore, the invention should not be limited to what is shown in FIG. 2.

According to an embodiment of the invention, the processing circuit 222 and the application processing device 130 may comprise a plurality of logics designed for handling one or more functionalities. The logics may be configured to execute the program codes of one or more software and/or firmware modules, thereby performing the corresponding operations. When performing the corresponding operations by executing the corresponding programs, the logics may be regarded as dedicated hardware devices or circuits, such as dedicated processor sub-units. Generally, the processing circuit 222 may be configured to perform operations of relative lower protocol layers while the application processing device 130 may be configured to perform operations of relative higher protocol layers. Therefore, in some embodiments of the invention, the application processing device 130 may be regarded as the upper layer entity or upper layer processing circuit with respect to the processing circuit 222 and the processing circuit 222 may be regarded as the lower layer entity or lower layer processing circuit with respect to the application processing device 130.

Figure 3:
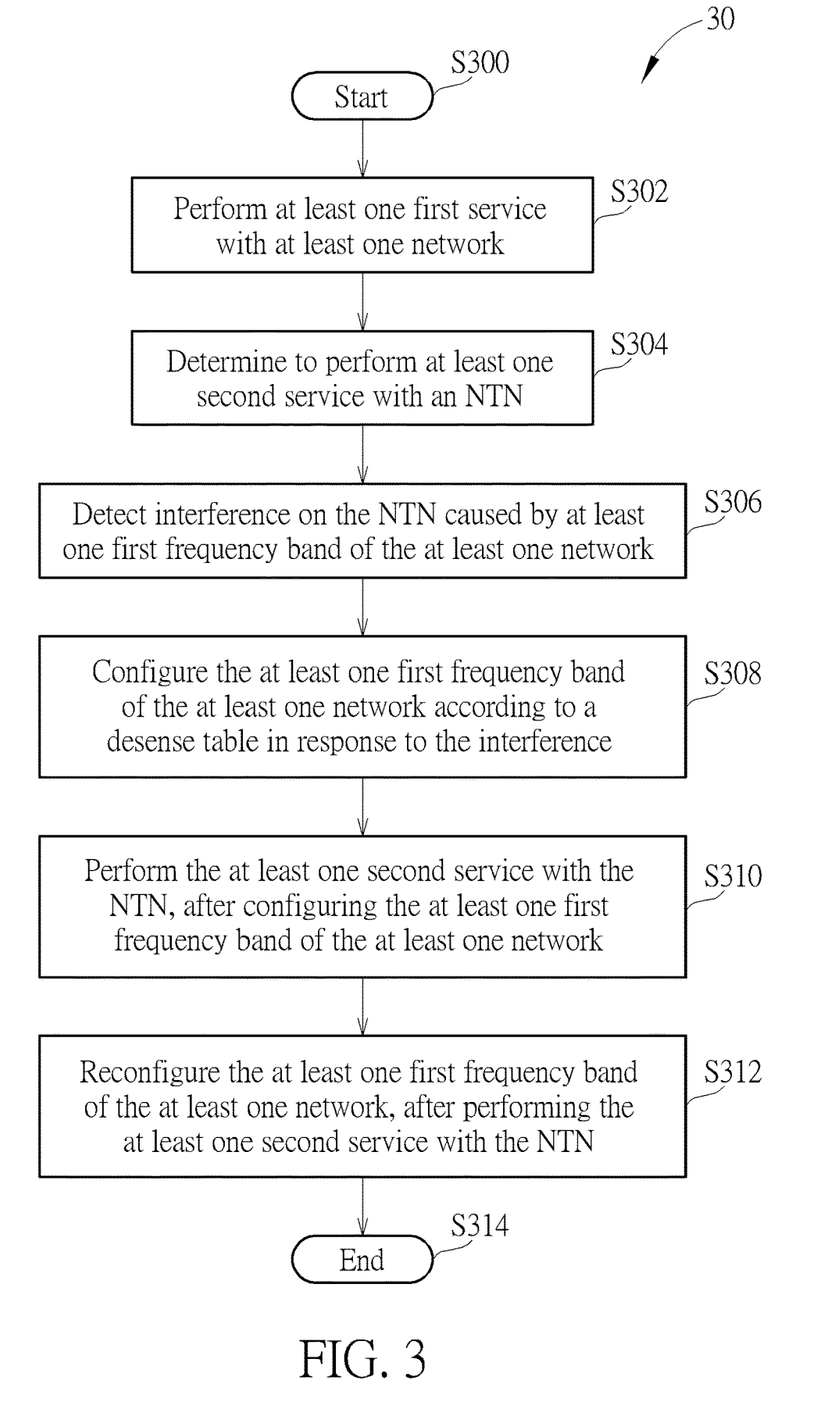
FIG. 3 is a flowchart of a process according to an embodiment of the invention.

FIG. 3 is a flowchart of a process 30 utilized in a communication apparatus (e.g., the communication apparatus 100 shown in FIG. 1) according to an embodiment of the invention, to handle interference on an NTN. Provided that the result is substantially the same, the steps are not required to be executed in the exact order shown in FIG. 3. The process 30 comprises the following steps:

Step S300: Start.

Step S302: Perform at least one first service with at least one network.

Step S304: Determine to perform at least one second service with an NTN.

Step S306: Detect interference on the NTN caused by at least one first frequency band of the at least one network.

Step S308: Configure the at least one first frequency band of the at least one network according to a desense table in response to the interference.

Step S310: Perform the at least one second service with the NTN, after configuring the at least one first frequency band of the at least one network.

Step S312: Reconfigure the at least one first frequency band of the at least one network, after performing the at least one second service with the NTN.

Step S314: End.

The processing circuit 222 is configured to perform steps of the process 30. According to the process 30, the communication apparatus determines (e.g., selects or is configured to enable) the NTN to perform the at least one second service, and detects (e.g., checks) the interference on the NTN caused by the at least one first frequency band of the at least one network. Then, the communication apparatus configures at least one first frequency band of the at least one network, before performing the at least one second service with the NTN. Thus, the interference is avoided, when the communication apparatus performs the at least one second service with the NTN. The coexistence of the NTN and other network(s) can be realized.

Realization of the process 30 is not limited to the above description. The following embodiments of the invention may be applied to realize the process 30.

In an embodiment of the invention, the at least one network comprises at least one of a TN (e.g., an LTE network and/or a NR network), a WLAN (e.g., WiFi) or a PAN (e.g., BT). In an embodiment of the invention, the desense table is obtained according to at least one measurement of the at least one network. That is, the communication apparatus obtains the desense table by measuring the at least one first frequency band of the at least one network. In an embodiment of the invention, the communication apparatus configures the at least one first frequency band of the at least one network according to the desense table, to reduce the interference of the at least one network.

There are various ways to configure the at least one first frequency band of the at least one network according to the desense table. In an embodiment of the invention, the communication apparatus reduces (e.g., turns down) at least one maximum transmission (Tx) power of the at least one first frequency band. In an embodiment of the invention, the communication apparatus disables the at least one first frequency band. In an embodiment of the invention, the communication apparatus changes (e.g., hops) the at least one first frequency band to at least one second frequency band.

A Table 1 is an embodiment of the desense table as follows. The communication apparatus obtains the Table 1 by measuring frequency bands (comprising the LTE Band X, the NR Band Y, the WiFi Frequency A, the WiFi Frequency B, the BT Frequency A and the BT Frequency B) of the LTE network, the NR network, the WiFi and the BT. The communication apparatus may configure the frequency band (s) of the LTE network, the NR network, the WiFi and/or the BT according to the Table 1. For example, the communication apparatus reduces the maximum Tx power of the LTE Band X by 3 decibel (dB). For example, the communication apparatus disables the NR Band Y. For example, the communication apparatus changes the WiFi Frequency A to the WiFi Frequency B. For example, the communication apparatus changes the BT Frequency A to the BT Frequency B. The above examples or any combination of the above examples may be applied to configure the frequency band(s) of the LTE network, the NR network, the WiFi and/or the BT according to the Table 1.

TABLE 1

| Frequency Band | Backoff Value | Changing Frequency | Disable |
|---|---|---|---|
| LTE Band X | 3 dB | N/A | N |
| NR Band Y | N/A | N/A | Y |
| WiFi Frequency A | N/A | WiFi Frequency B | N |
| BT Frequency A | N/A | BT Frequency B | N |

There are various ways to reconfigure the at least one first frequency band of the at least one network. In an embodiment of the invention, the communication apparatus recovers (e.g., turns up) the at least one maximum Tx power of the at least one first frequency band. In an embodiment of the invention, the communication apparatus enables the at least one first frequency band. In an embodiment of the invention, the communication apparatus changes (e.g., hops) the at least one second frequency band to the at least one first frequency band.

According to the Table 1, the communication apparatus may reconfigure the frequency band (s) of the LTE network, the NR network, the WiFi and/or the BT. For example, the communication apparatus recovers the maximum Tx power of the LTE Band X by 3 dB. For example, the communication apparatus enables the NR Band Y. For example, the communication apparatus changes the WiFi Frequency B to the WiFi Frequency A. For example, the communication apparatus changes the BT Frequency B to the BT Frequency A. The above examples or any combination of the above examples may be applied to reconfigure the frequency band(s) of the LTE network, the NR network, the WiFi and/or the BT according to the Table 1.

In an embodiment of the invention, the communication apparatus turns on (e.g., wakes up) the NTN, after configuring the at least one first frequency band of the at least one network. In an embodiment of the invention, the communication apparatus configures (e.g., triggers) the NTN to enter in a sleeping mode, after performing the at least one second service with the NTN (successfully). In an embodiment of the invention, the communication apparatus turns off the NTN, after the communication apparatus performs the at least one second service with the NTN (unsuccessfully) (e.g., the communication apparatus fails to perform the at least one second service with the NTN) or the NTN is disabled (e.g., the communication apparatus is configured to disable the NTN).

In an embodiment of the invention, the communication apparatus determines whether the interference on the NTN caused by the at least one first frequency band of the at least one network exists. The communication apparatus configures the at least one first frequency band of the at least one network according to the desense table in response to the interference and turns on the NTN, if the interference exists. The communication apparatus turns on the NTN directly and does not configure the at least one first frequency band of the at least one network, if the interference does not exist. That is, the communication apparatus turns on the NTN directly and does not configure the at least one first frequency band of the at least one network, when communication apparatus does not detect the interference. In an embodiment of the invention, the communication apparatus reconfigures the at least one first frequency band of the at least one network, after turning off the NTN or configuring the NTN to enter in the sleeping mode.

Figure 4A:
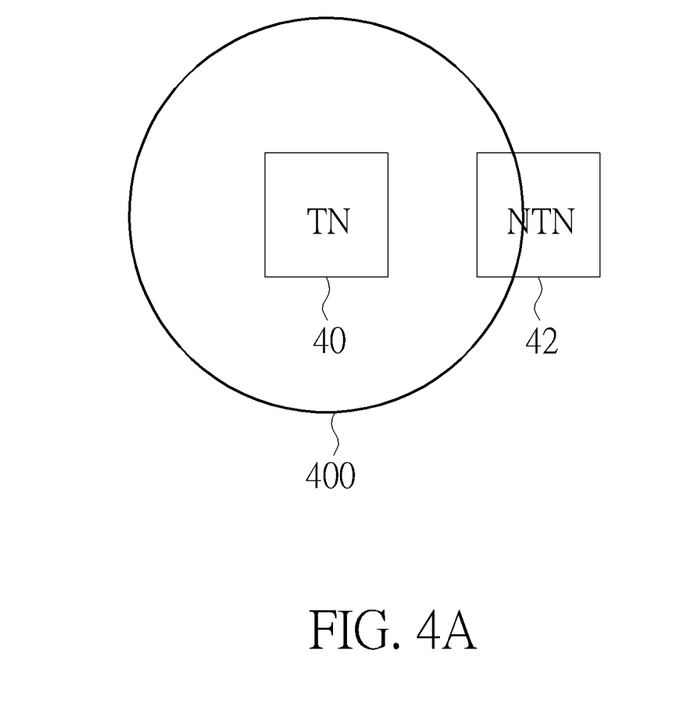
FIGS. 4A and 4B are is schematic diagrams of coexistence of a TN and an NTN according to an example of the present invention.
Figure 4B:
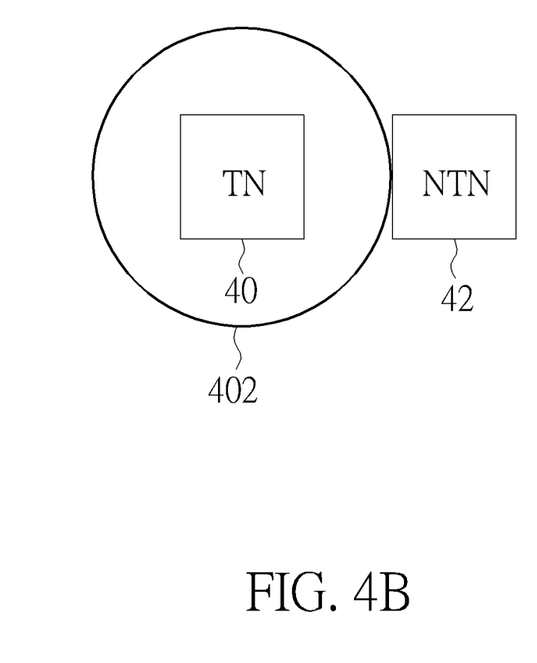

FIGS. 4A and 4B are schematic diagrams of coexistence of a TN 40 and an NTN 42 according to an example of the present invention. There are the TN 40 (e.g., the at least one network in the process 30) and the NTN 42 (e.g., the NTN in the process 30) in the present example. In FIG. 4A, the TN 40 performs the operation(s) (e.g., the at least one first service in the process 30), and the Tx power 400 of the TN 40 has strong interference on the Rx of NTN 42. The interference makes the NTN 42 to work inefficiently on a communication apparatus (not shown) (e.g., the communication apparatus in the process 30) supporting the TN40 and the NTN 42 simultaneously.

In FIG. 4B, a frequency/frequencies of the TN 40 causing the interference is/are configured to reduce the Tx power 400 to a reduced Tx power 402, before the NTN 42 is turned on. The reduced Tx power 402 of the TN 40 has acceptable interference on the NTN 42, when the TN 40 and the NTN 42 operate simultaneously. Then, the frequency/frequencies of the TN 40 causing the interference is/are reconfigured to recover the reduced Tx power 402 to the Tx power 400 in FIG. 4A, after the NTN 42 performs the operation(s) (e.g., the at least one second service in the process 30) (successfully or unsuccessfully), is turned off or is configured to enter in a sleeping mode. The ways to configure and reconfigure the frequency/frequencies of the TN 40 can be referred to the above embodiments, and not narrated herein.

In FIGS. 4A and 4B, the TN 40 may be replaced by the WLAN (e.g., WiFi) or the PAN (e.g., BT).

Figure 5:
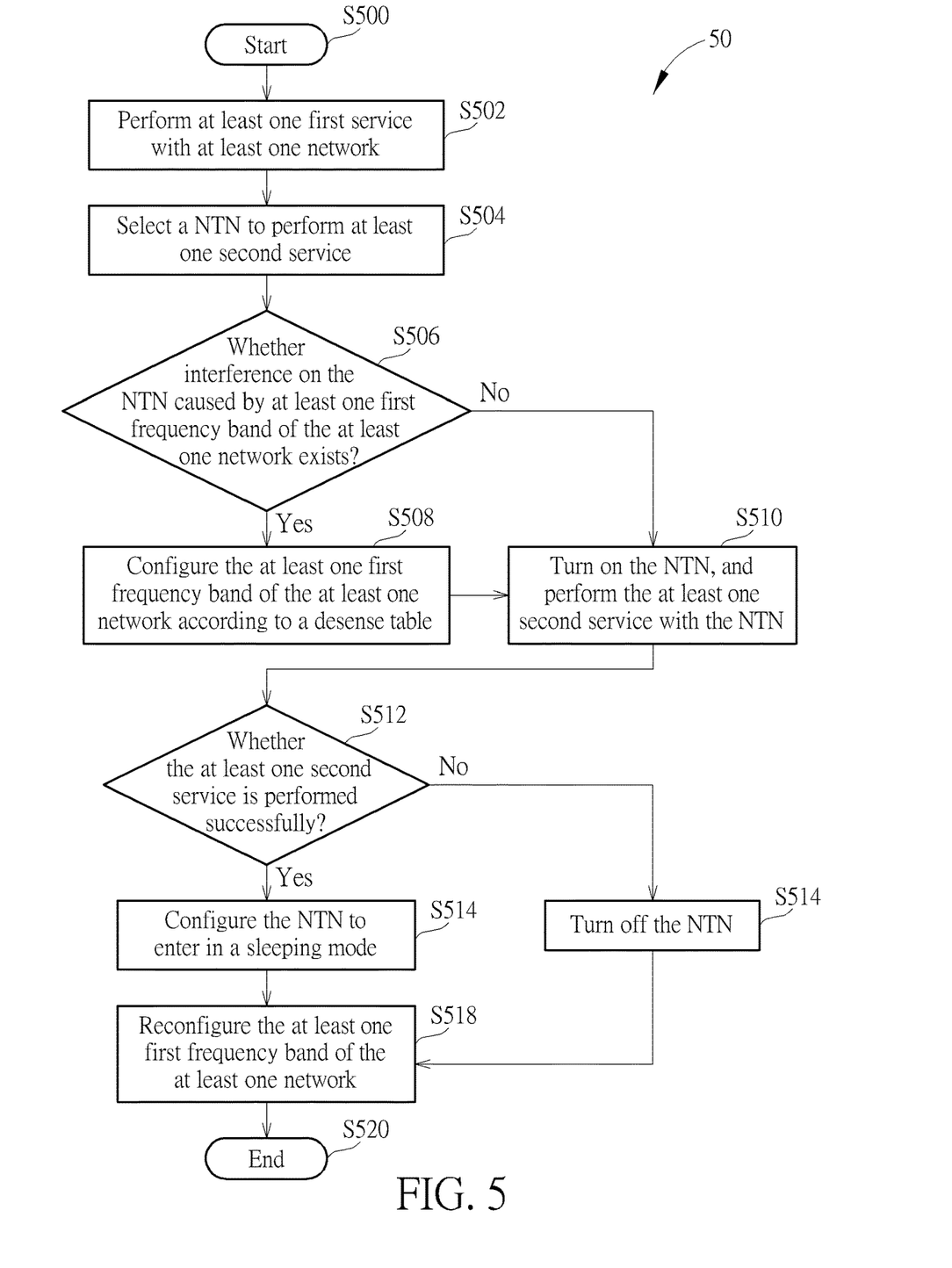
FIG. 5 is a flowchart of a process according to an embodiment of the invention.

Operations of the communication apparatus (e.g., in a NTN non-standby mode) in the above embodiments can be summarized into a process 50 shown in FIG. 5. The process 50 may be performed by the processing circuit 222, and comprises the following steps:

Step S500: Start.

Step S502: Perform at least one first service with at least one network.

Step S504: Select an NTN to perform at least one second service.

Step S506: Whether interference on the NTN caused by at least one first frequency band of the at least one network exists? If yes, perform Step S508. If no, perform Step S510.

Step S508: Configure the at least one first frequency band of the at least one network according to a desense table.

Step S510: Turn on the NTN, and perform the at least one second service with the NTN.

Step S512: Whether the at least one second service is performed successfully? If yes, perform Step S514. If no, perform Step S516.

Step S514: Configure the NTN to enter in a sleeping mode, and perform Step S518.

Step S516: Turn off the NTN.

Step S518: Reconfigure the at least one first frequency band of the at least one network.

Step S520: End.

Figure 6:
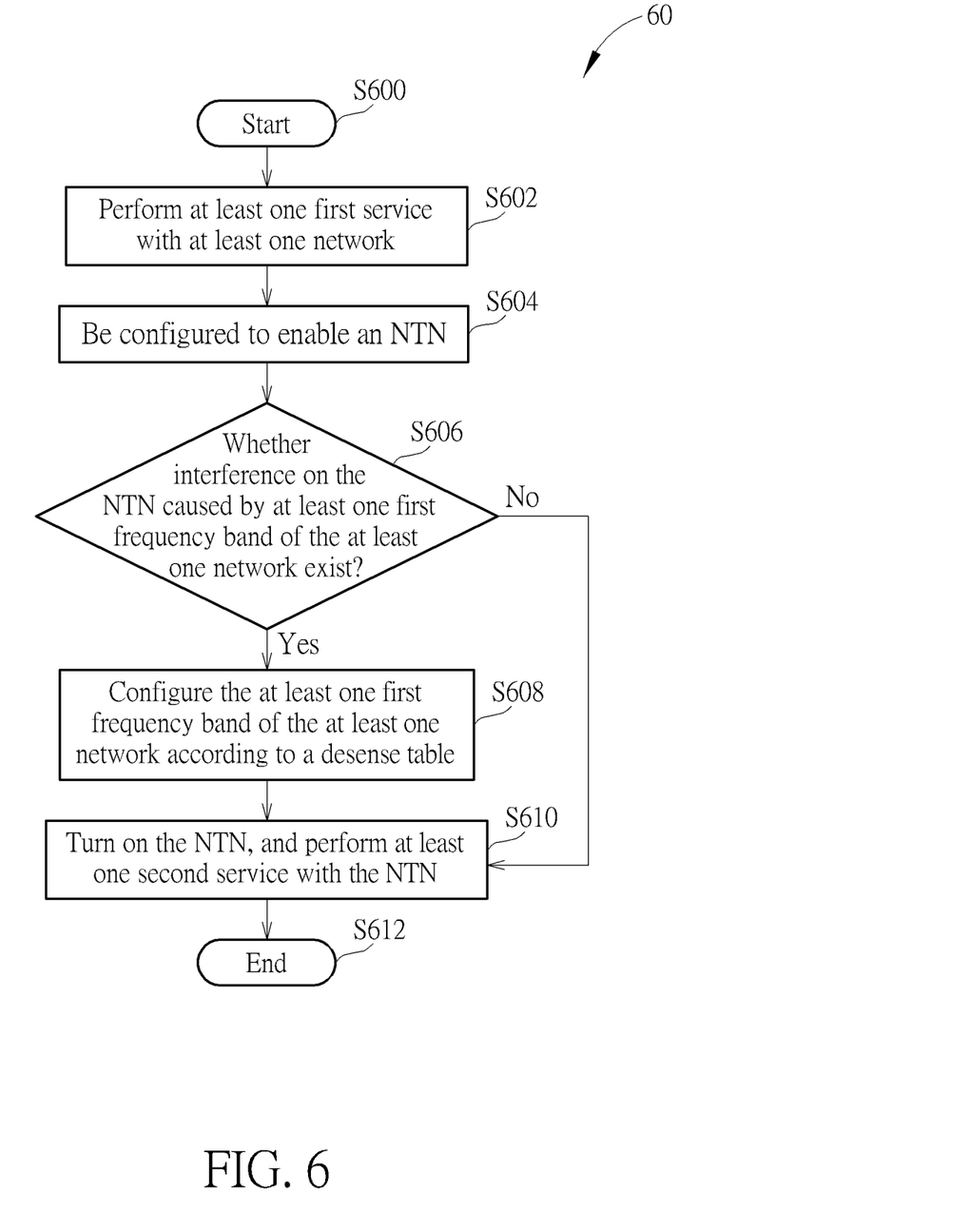
FIG. 6 is a flowchart of a process according to an embodiment of the invention.

Operations of the communication apparatus (e.g., in a NTN standby mode) in the above embodiments can be summarized into a process 60 shown in FIG. 6. The process 60 may be performed by the processing circuit 222, and comprises the following steps:

Step S600: Start.

Step S602: Perform at least one first service with at least one network.

Step S604: Be configured to enable an NTN.

Step S606: Whether interference on the NTN caused by at least one first frequency band of the at least one network exist? If yes, perform Step S608. If no, perform Step S610.

Step S608: Configure the at least one first frequency band of the at least one network according to a desense table.

Step S610: Turn on the NTN, and perform at least one second service with the NTN.

Step S612: End.

Figure 7:
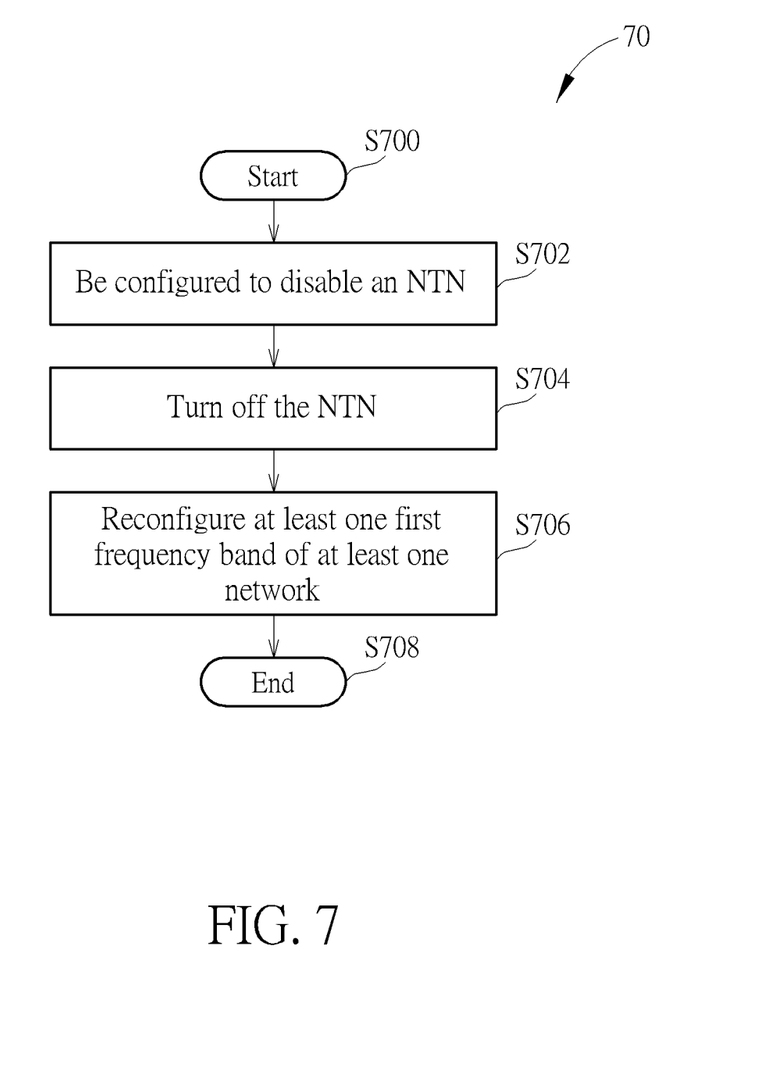
FIG. 7 is a flowchart of a process according to an embodiment of the invention.

Operations of the communication apparatus (e.g., in a NTN standby mode) in the above embodiments can be summarized into a process 70 shown in FIG. 7. The process 70 may be performed by the processing circuit 222, and comprises the following steps:

Step S700: Start.

Step S702: Be configured to disable an NTN (e.g., the NTN in the process 60).

Step S704: Turn off the NTN.

Step S706: Reconfigure at least one first frequency band (e.g., the at least one first frequency band in the process 60) of at least one network.

Step S708: End.

The processes 50-70 are used for illustrating the operations of the communication apparatus in FIG. 1. Detailed description and variations of the processes 50-70 can be referred to the previous description, and are not narrated herein.

In the process 50, the NTN is turned on, if the NTN is selected to perform (e.g., provide) the at least one second service. The NTN enters the sleeping mode, if the at least one second service is performed successfully or is acquired. The NTN is turned off, if the at least one second service is performed unsuccessfully or is not acquired. Thus, the service(s) performed by the communication apparatus and the at least one network is not influenced by the NTN and the power consumption is decreased, while the NTN is in the sleeping mode or is off.

In the process 60, the NTN is always on, while the NTN is enabled. Thus, the service(s) performed by the communication apparatus and the NTN has continuity and the data transfer latency is decreased, while the NTN is on. In the process 70, the NTN is turned off, after the NTN is disabled. In the steps S604 and S702, the communication apparatus is configured by a user.

To sum up, the present invention provides a communication apparatus and a method for handling interference on an NTN. The communication apparatus configures at least one frequency of other network(s) before performing service(s) with the NTN, and reconfigures the at least one frequency of the other network(s) after performing the service (s) with the NTN. Therefore, the interference on the NTN caused by the other network(s) is avoided, and the coexistence of the NTN and the other network(s) can be realized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication apparatus, comprising:
   a radio transceiver, configured to transmit or receive wireless signals; and
   a processing circuit, coupled to the radio transceiver and configured to perform operations comprising:
   performing at least one first service with at least one network;
   determining to perform at least one second service with a non-terrestrial network (NTN);
   detecting interference on the NTN caused by at least one first frequency band of the at least one network;
   configuring the at least one first frequency band of the at least one network according to a desense table in response to the interference;
   performing the at least one second service with the NTN, after configuring the at least one first frequency band of the at least one network; and
   configuring the NTN to enter in a sleeping mode or turning off the NTN, and reconfiguring the at least one first frequency band of the at least one network, after performing the at least one second service with the NTN.

2. The communication apparatus of claim 1, wherein the at least one network comprises at least one of a terrestrial network (TN), a wireless local area network (WLAN) or a personal area network (PAN).

3. The communication apparatus of claim 1, wherein the desense table is obtained according to at least one measurement of the at least one network.

4. The communication apparatus of claim 1, wherein the processing circuit reduces at least one maximum transmission (Tx) power of the at least one first frequency band, to configure the at least one first frequency band of the at least one network according to the desense table; and the processing circuit recovers the at least one maximum Tx power of the at least one first frequency band, to reconfigure the at least one first frequency band of the at least one network.

5. The communication apparatus of claim 1, wherein the processing circuit disables the at least one first frequency band, to configure the at least one first frequency band of the at least one network according to the desense table; and the processing circuit enables the at least one first frequency band, to reconfigure the at least one first frequency band of the at least one network.

6. The communication apparatus of claim 1, wherein the processing circuit changes the at least one first frequency band to at least one second frequency band, to configure the at least one first frequency band of the at least one network according to the desense table; and the processing circuit changes the at least one second frequency band to the at least one first frequency band, to reconfigure the at least one first frequency band of the at least one network.

7. The communication apparatus of claim 1, wherein the processing circuit turns on the NTN, after configuring the at least one first frequency band of the at least one network.

8. A method for handling interference on a non-terrestrial network (NTN), comprising:

performing at least one first service with at least one network;

determining to perform at least one second service with the NTN;

detecting the interference on the NTN caused by at least one first frequency band of the at least one network;

configuring the at least one first frequency band of the at least one network according to a desense table in response to the interference;

performing the at least one second service with the NTN, after configuring the at least one first frequency band of the at least one network; and configuring the NTN to enter in a sleeping mode or turning off the NTN, and reconfiguring the at least one first frequency band of the at least one network, after performing the at least one second service with the NTN.

9. The method of claim 8, wherein the at least one network comprises at least one of a terrestrial network (TN), a wireless local area network (WLAN) or a personal area network (PAN).

10. The method of claim 8, wherein the desense table is obtained according to at least one measurement of the at least one network.

11. The method of claim 8, wherein the step of configuring the at least one first frequency band of the at least one network according to the desense table comprises:

reducing at least one maximum transmission (Tx) power of the at least one first frequency band; and the step of reconfiguring the at least one first frequency band of the at least one network comprises:

recovering the at least one maximum Tx power of the at least one first frequency band.

12. The method of claim 8, wherein the step of configuring the at least one first frequency band of the at least one network according to the desense table comprises:

disabling the at least one first frequency band; and the step of reconfiguring the at least one first frequency band of the at least one network comprises:

enabling the at least one first frequency band.

13. The method of claim 8, wherein the step of configuring the at least one first frequency band of the at least one network according to the desense table comprises:

changing the at least one first frequency band to at least one second frequency band; and the step of reconfiguring the at least one first frequency band of the at least one network comprises:

changing the at least one second frequency band to the at least one first frequency band.

14. The method of claim 8, wherein the NTN is turned on, after the at least one first frequency band of the at least one network is configured.

* * * * *